(12) United States Patent
Youn et al.

(10) Patent No.: US 8,514,747 B2
(45) Date of Patent: Aug. 20, 2013

(54) METHOD OF EMERGENCY COMMUNICATION IN BROADBAND RADIO ACCESS SYSTEM

(75) Inventors: Ae Ran Youn, Gyeonggi-do (KR); Yong Ho Kim, Gyeonggi-do (KR); Ki Seon Ryu, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 607 days.

(21) Appl. No.: 12/597,488

(22) PCT Filed: Apr. 25, 2008

(86) PCT No.: PCT/KR2008/002366
§ 371 (c)(1),
(2), (4) Date: Oct. 23, 2009

(87) PCT Pub. No.: WO2008/133450
PCT Pub. Date: Nov. 6, 2008

(65) Prior Publication Data
US 2010/0118741 A1 May 13, 2010

(30) Foreign Application Priority Data
Apr. 25, 2007 (KR) .................. 10-2007-0040330

(51) Int. Cl.
*H04W 72/12* (2009.01)
(52) U.S. Cl.
USPC ........... 370/259; 370/328; 370/331; 370/335; 455/404.1; 455/405; 455/434
(58) Field of Classification Search
USPC ....... 370/335, 341, 458, 328, 259; 455/404.1
See application file for complete search history.

(56) References Cited

U.S. PATENT DOCUMENTS

| | | | |
|---|---|---|---|
| 6,188,882 B1 | 2/2001 | Tarkiainen et al. | |
| 6,633,754 B1* | 10/2003 | Raith | 455/404.1 |
| 6,801,762 B1 | 10/2004 | Huilgol | |
| 7,978,673 B1* | 7/2011 | Uhlik et al. | 370/341 |
| 2007/0104177 A1* | 5/2007 | Hwang et al. | 370/348 |
| 2008/0009262 A1* | 1/2008 | Rudolf et al. | 455/404.1 |
| 2009/0109932 A1* | 4/2009 | Maheshwari et al. | 370/335 |
| 2009/0252120 A1* | 10/2009 | Kim et al. | 370/331 |
| 2010/0135205 A1* | 6/2010 | Li et al. | 370/328 |

* cited by examiner

*Primary Examiner* — Andrew Chriss
*Assistant Examiner* — Mohamed Kamara
(74) *Attorney, Agent, or Firm* — Lee, Hong, Degerman, Kang & Waimey

(57) ABSTRACT

A method of emergency communication between a mobile station and a base station in a broadband radio access system and a mobile station which supports the method of emergency communication are disclosed. The method of emergency communication is divided into a case where the mobile station requests an emergency service in a state that the mobile station is registered with the base station and a case where the mobile station requests an emergency service in a state that the mobile is not registered with the base station. In case of the one case, the mobile station requests the base station of an emergency service using a newly defined emergency code or a conventional bandwidth request code and negotiates a basic function required for an emergency service with the base station through predetermined header data. In case of the other case, the mobile station starts initial ranging using a newly defined emergency code or a conventional initial ranging code and negotiates a basic function required for an emergency service through a subscriber basic capability message (SBC-REQ/RSP).

10 Claims, 8 Drawing Sheets

FIG. 3

| HT=1 (1) | EC=0 (1) | Type =001 (3) | Emergency Service Indication = 1 (1) | Traffic priority = 7 (8) | Type of Data Delivery Service MSB(2) |
|---|---|---|---|---|---|
| Type of Data Delivery Service LSB(6) ||| Reserved (2) | CID MSB(8) ||
| CID MSB(8) |||| HCS(8) ||

MSB

METHOD OF EMERGENCY COMMUNICATION IN BROADBAND RADIO ACCESS SYSTEM

CROSS-REFERENCE TO RELATED APPLICATIONS

This application is the National Stage filing under 35 U.S.C. 371 of International Application No. PCT/KR2008/002366, filed on Apr. 25, 2008, which claims the benefit of earlier filing date and right of priority to Korean Patent Application No. 10-2007-0040330, filed on Apr. 25, 2007.

DESCRIPTION

1. Technical Field

The present invention relates to a method of performing emergency communication between a mobile station and a base station in a broadband radio access system.

2. Background Art

FIG. 1 is a flow chart illustrating a conventional initial network entry procedure in a broadband radio access system.

If a mobile station is initially powered on, the mobile station scans whether there is an effective downlink channel (S101). And, the mobile station receives a downlink-map (DL-MAP) message and an uplink-map (UL-MAP) message from a base station and adjusts downlink channel synchronization and uplink channel synchronization, respectively (S102). Afterwards, the mobile station receives a downlink channel description (DCD) message and an uplink channel description (UCD) message to complete physical channel establishment of a downlink channel and an uplink channel. The mobile station uses the physical channel establishment to analyze various kinds of information transferred through the uplink channel and the downlink channel.

The mobile station performs initial ranging with the base station to adjust parameters for uplink transmission, such as timing offset and transmission power, and is allocated with basic management connection identifier (CID) and primary management CID from the base station, wherein the CIDs are required for transmission of various kinds of management messages (S103).

The mobile station identifies a transport mode which the mobile station currently supports and a transport mode which the base station currently supports, through message exchange with the base station, and establishes a communication mode to be performed through this access (S104).

The mobile station performs mutual authentication with the base station to determine whether there is conformity between the mobile station and the base station, and generates and exchanges an encryption key if it is determined that there is conformity between the mobile station and the base station (S105). A later transport message includes a message authentication code generated through the encryption key, so that the base station can perform authentication of the message transmitted from the corresponding mobile station.

After being allowed network entry from a network service provider (NSP) of a network to which the base station belongs to, the mobile station is allocated with a secondary management CID from the base station (S106).

The mobile station is allocated with IP address for IP packet transmission from a DHCP server (S107), and updates current date and time through communication with a time server (S108). The mobile station receives a system setup file which includes information for management of the mobile station from a TFTP server (S109).

The base station generates a pre-provisioned service flow to allow a service provider to provide the mobile station with a specific service, so that the service provider can provide a pre-provisioned service for the mobile station (S110).

In the initial registration procedure as described above, since the aforementioned initial ranging procedure of step S103 is performed through a contention based uplink interval, if there exist a plurality of mobile stations which perform ranging at the same time, collision may occur between the respective mobile stations. In other words, if the mobile station has forwarded ranging request to the base station but has not received ranging response from the base station for a certain time period, since this means that collision has occurred, the mobile station again transmits ranging response to the base station.

Furthermore, in the initial registration procedure, the mobile station forwards initial ranging request for adjusting transmission parameters of an uplink to the base station, and receives a ranging response message from the base station several times to adjust parameters such as transmission power, thereby receiving a desired service.

Meanwhile, when the mobile station intends to request a desired service in a state that it has been already registered with the base station, the mobile station is allocated with a required bandwidth through a contention based uplink bandwidth request procedure and should additionally perform several procedures for setup of a specific service.

However, when a service to be requested by the mobile station is an emergency rescue service or an emergency data transmission service, if emergency call connection is delayed due to collision of ranging request as above and a complicate procedure required for providing a service, it may cause a serious problem.

DETAILED DESCRIPTION OF THE INVENTION

Technical Problems

Accordingly, the present invention is directed to a method of emergency communication in a broadband radio access system, which substantially obviates one or more problems due to limitations and disadvantages of the related art. An object of the present invention is to promptly provide an emergency service by defining a separate code for emergency communication to prevent collision between mobile stations from occurring and previously reporting emergency status in case of a bandwidth allocation request to avoid repetition of unnecessary resource allocation.

Technical Solutions

To achieve the object and other advantages and in accordance with the purpose of the invention, as embodied and broadly described herein, a method of emergency communication in a broadband radio access system in a state that a mobile station is registered with a base station comprises requesting the base station to allocate a first uplink bandwidth; transmitting information of the mobile station and emergency service information through the first uplink bandwidth; generating a corresponding service flow if identification information related to a service generated considering the emergency service information is transmitted from the base station; and performing emergency communication with the base station through a second uplink bandwidth allocated for an emergency service.

In another aspect of the present invention, a method of emergency communication in a broadband radio access system in a state that a mobile station is not registered with a base station comprises initial ranging which includes requesting the base station to allocate a first uplink bandwidth for ranging and transmitting information of the mobile station and emergency service information through the allocated first uplink bandwidth; generating a corresponding service flow if identification information related to a service generated considering the emergency service information is transmitted from the base station; and performing emergency communication with the base station through a second uplink bandwidth allocated for an emergency service. The method of emergency communication further comprises negotiating a basic function that can support the emergency service between the mobile station and the base station.

In other aspect of the present invention, a mobile station for requesting an emergency service in a state that the mobile station is registered with a base station comprises a control module requesting the base station to allocate a first uplink bandwidth, transmitting information of the mobile station and emergency service information through the first uplink bandwidth, generating a corresponding service flow if identification information related to a service generated considering the emergency service information is transmitted from the base station, and performing emergency communication with the base station through a second uplink bandwidth allocated for an emergency service.

In the above aspects, requesting the base station to allocate a first uplink bandwidth is performed using an emergency code separately defined for the emergency service or a bandwidth request code for ranging request.

Furthermore, the basic requirements include at least one of traffic priority and type of data delivery service, and the identification information related to the emergency service includes at least one of service flow ID and traffic CID.

Furthermore, the identification information related to the emergency service is transmitted through a response message separately defined for the emergency service. A dynamic service additional response message (DSA-RSP) can be used as the response message.

Furthermore, the emergency service information includes at least one of traffic priority and type of data delivery service.

Furthermore, the initial ranging can be requested using an emergency code separately defined for the emergency service or an initial ranging code.

Advantageous Effects

According to the present invention, since an emergency service is requested through a newly defined code, the probability of collision between mobile stations can be lowered remarkably. Since repetition of unnecessary resource allocation can be avoided by previously reporting an emergency status in case of a bandwidth allocation request, it is possible to promptly provide an emergency service.

BRIEF DESCRIPTION OF THE DRAWINGS

FIG. 3 illustrates an example of a bandwidth request header transmitted from a mobile station to a base station;

BEST MODE FOR CARRYING OUT THE INVENTION

Hereinafter, structures, operations, and other features of the present invention will be understood readily by the preferred embodiments of the present invention, examples of which are illustrated in the accompanying drawings.

Generally, a wireless emergency service can be classified into a wireless emergency rescue service and a wireless emergency alert service. The wireless emergency rescue service means a service for supporting safe rescue by identifying location of a mobile station of a corresponding user when fire, crime, and other emergency status occur to the user. The wireless emergency alert service is a service for providing emergency notification such as storm warning, imminent earthquake and tidal waves warning, and atomic, biological and chemical accidents, to wireless subscribers within a given geographic place. The emergency alert service serves to broadcast an alert message to all mobile stations located in a specific zone.

The present invention has been suggested to aim for the wireless emergency rescue service, which is divided into a case where the mobile station requests an emergency rescue service to a base station as emergency status occurs in the mobile station which is being communicated with the base station and a case where the mobile station which is not connected with a base station requests an emergency rescue service to a base station to which the mobile station currently belongs.

<Embodiment 1-1>

This embodiment relates to a case where a mobile station which is being communicated with a base station requests an emergency service. Especially, this embodiment relates to a case where a mobile station requests an emergency service by using an emergency CDMA code.

Figure 1:
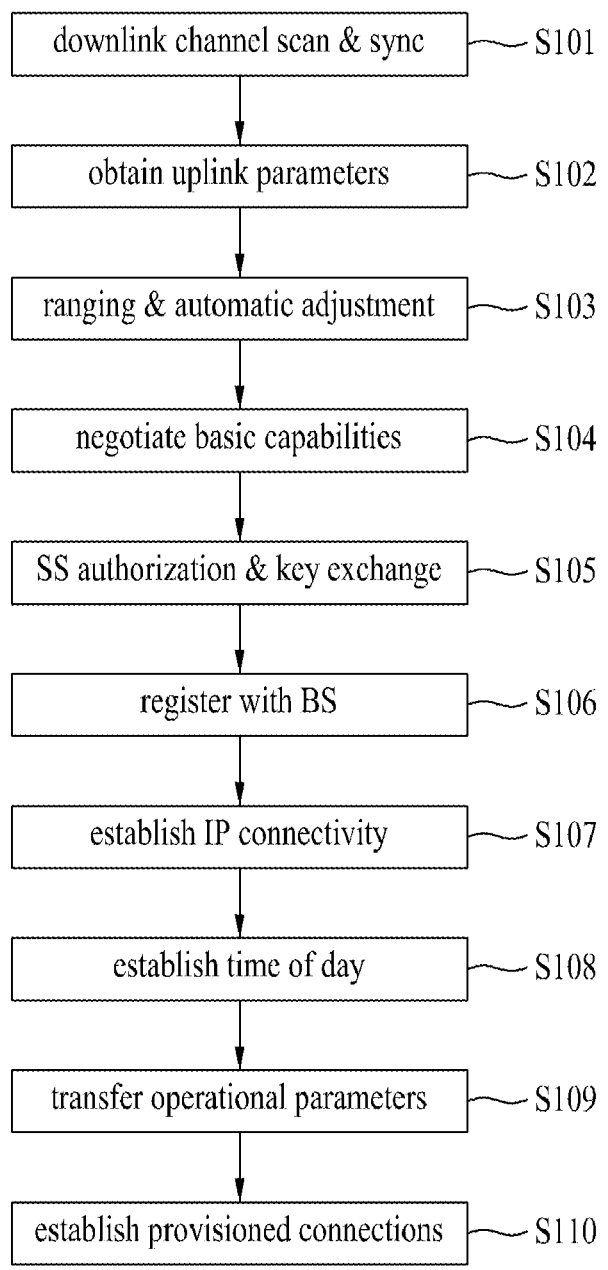
FIG. 1 is a flow chart illustrating a conventional initial network entry procedure in a broadband radio access system.
Figure 2:
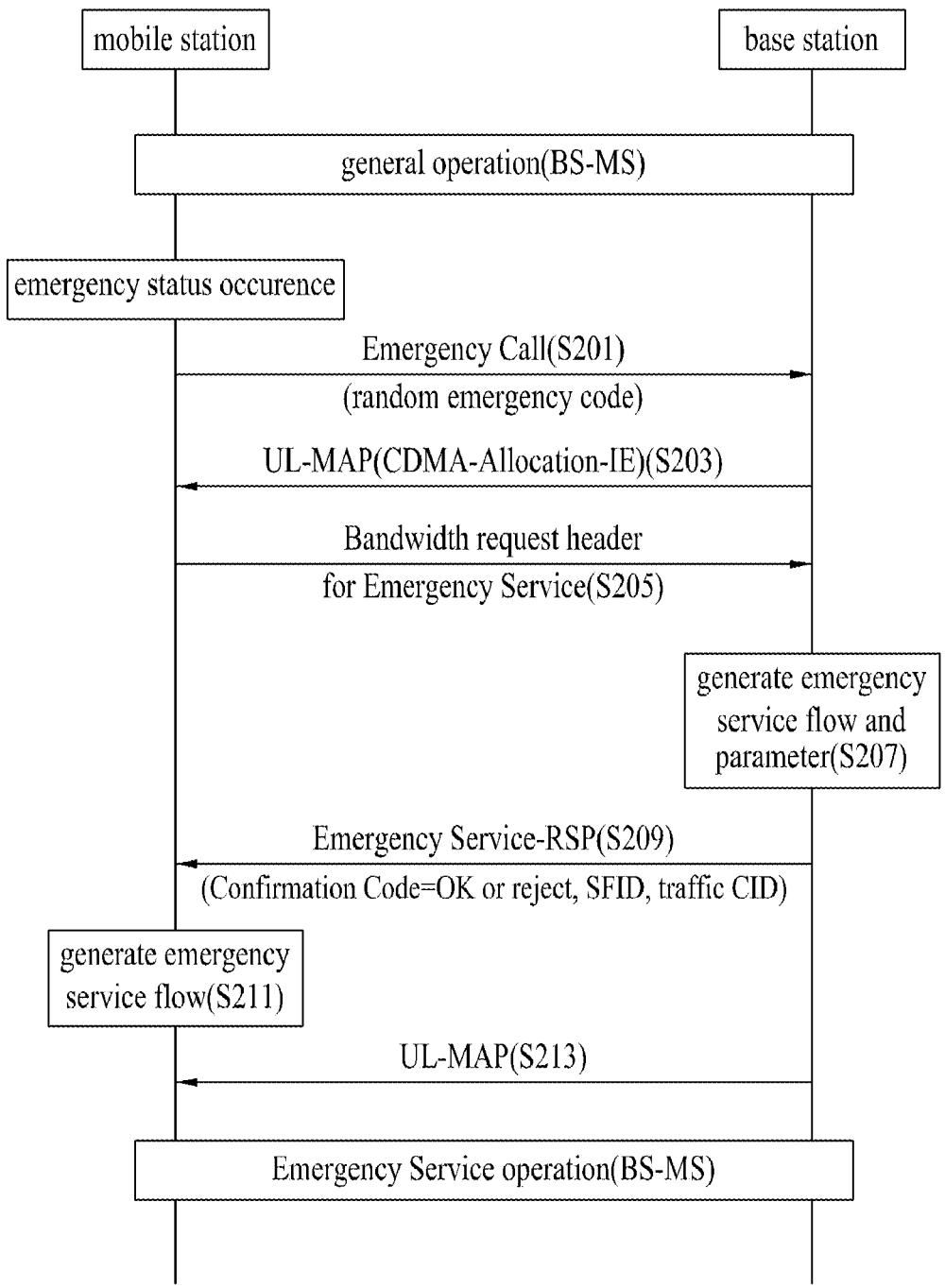
FIG. 2 is a signal flow chart illustrating a sequential procedure of establishing an emergency communication path in a mobile station which is being communicated with a base station.

FIG. 2 is a signal flow chart illustrating a sequential procedure of establishing an emergency communication path in a mobile station which is being communicated with a base station.

When performing an initial ranging procedure, the mobile station receives a CDMA code set included in an uplink channel description message (UCD message) from the base station, wherein the CDMA code set is to be used for analyzing various kinds of information transferred through an uplink channel and a downlink channel. Table 1 illustrates an example of an UCD message and ranging related TLV parameters included in the UCD message.

TABLE 1

| Syntax | Size | Notes |
|---|---|---|
| UCD_Message_Format( ) { | | |
| Management Message Type = 0 | 8 bits | |
| Configuration Change Count | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded information for the overall channel | variable | TLV specific |
| Begin PHY Specific Section { | | See applicable PHY section. |
| for(i= 1; i <= n; i++) { | | For each uplink burst profile 1 to n. |
| Uplink_Burst_Profile | variable | PHY specific |
| } | | |
| } | | |
| } | | |

In this embodiment, it is supposed that the CDMA code set includes an emergency CDMA code.

If an emergency status occurs in the mobile station, the mobile station selects a random emergency code among emergency CDMA codes included in the UCD message received from the base station, and transmits the selected emergency code to the base station through a first uplink bandwidth (for example, subchannel allocated by UIUC=12, and slot configured by symbols) which is previously allocated (S201). In this case, it is supposed that UIUC=12 designates CDMA ranging and CDMA bandwidth request.

Table 2 illustrates an example of TLV parameters related to CDMA codes and emergency codes for ranging and bandwidth request included in the UCD message of Table 1.

TABLE 2

| Name | Type (1 byte) | Length | Value |
|---|---|---|---|
| Start of ranging codes group | 155 | 1 | Indicates the starting number, S, of the group of codes used for this uplink. If not specified, the default value shall be set to zero. All the ranging codes used on this uplink will be between S and ((S + O + N + M + L + P) mod 256). Where, N is the number of initial-ranging codes. M is the number of periodic-ranging codes. L is the number of bandwidth-request codes. O is the number of handover-ranging codes. P is the number of emergency request Codes. The range of values is $0 = S = 255$. |
| Initial ranging codes | 150 | 1 | Number of initial ranging CDMA codes. Possible values are 0x55. |
| Periodic ranging codes | 151 | 1 | Number of periodic ranging CDMA codes. Possible values are 0x55. |
| Bandwidth request codes | 152 | 1 | Number of bandwidth request codes. Possible values are 0x55. |
| Handover ranging codes | 194 | 1 | Number of handover ranging CDMA codes. Possible values are 0x55 |
| Emergency request codes | 199 | 1 | Number of emergency ranging CDMA codes. Possible values are 0-255. |

The first uplink bandwidth is a contention based ranging interval allocated from the base station to the mobile stations through an uplink map information element (UL-MAP_IE), and can be divided into an initial ranging interval, a handover ranging interval, a periodic ranging interval, a bandwidth request ranging interval, and an emergency call request ranging interval depending on use of ranging. At this time, ranging interval for the emergency call request may be allocated separately from ranging intervals for the other purpose, or may be allocated simultaneously with ranging intervals for the other purpose.

In this case, UL-MAP is to define a method for using an uplink for offset of a burst related to Allocation Start Time, and includes the UL-MAP_IE.

Table 3 illustrates an example of the uplink map information element (UL-MAP_IE).

TABLE 3

| Syntax | Size | Notes |
|---|---|---|
| UL-MAP_IE( ) { | | |
| CID | 16 bits | |
| UIUC | 4 bits | |
| if (UIUC == 12) { | | |
| OFDMA Symbol offset | 8 bits | |
| Subchannel offset | 7 bits | |
| No. OFDMA Symbols | 7 bits | |
| No. Subchannels | 7 bits | |
| Ranging Method | 2 bits | 0b00: Initial Ranging/Handover Ranging over two symbols 0b01: Initial Ranging/Handover Ranging over four symbols 0b10: BW Request/Periodic |

TABLE 3-continued

| Syntax | Size | Notes |
|---|---|---|
| | | Ranging/Emergency Request over one symbol |
| | | 0b11: BW Request/Periodic Ranging/Emergency Request over three symbols |
| Reserved | 1 bit | Shall be set to zero |
| } else if (UIUC == 14) { | | |
| CDMA_Allocation_IE( ) | 32 bits | |
| Else if (UIUC == 15) { | | |
| Extended UIUC dependent IE | variable | See clauses following 8.4.5.4.3 |
| } else { | | |
| Duration | 10 bits | In OFDMA slots (see 8.4.3.1) |
| Repetition coding indication | 2 bits | 0b00: No repetition coding<br>0b01: Repetition coding of 2 used<br>0b10: Repetition coding of 4 used<br>0b11: Repetition coding of 6 used |
| } | | |
| Padding nibble, if needed | 4 bits | Completing to nearest byte, shall be set to 0. |
| } | | |

In Table 3, usage of an information element constituting the UL-MAP is defined by uplink interval usage code (UIUC) per connection ID (CID), and location of each ranging interval is defined by 'Duration.' Usage per ranging interval is defined in accordance with UIUC value used in the UL-MAP, and each interval starts from a point away from a start point of a previous information element (IE) by 'duration' defined in the UL-MAP information element (IE).

If the mobile station requests the base station of uplink bandwidth allocation by using the emergency CDMA code as above, since there are a small number of mobile stations which request bandwidth allocation due to emergency status within the same base station, collision caused by contention based allocation or service delay due to such a collision can be avoided.

If the emergency CDMA code is received from the mobile station, the base station allocates a second uplink bandwidth through an uplink information element (for example, CDMA-Allocation_IE) of the uplink map (UL-MAP) so that the corresponding mobile station can perform ranging request (S203). Table 4 illustrates an example of the uplink information element (CDMA-Allocation_IE) transmitted from the base station.

TABLE 4

| Syntax | Size | Notes |
|---|---|---|
| CDMA_Allocation_IE( ) { | | |
| Duration | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| Ranging Code | 8 bits | |
| Ranging Symbol | 8 bits | |
| Ranging subchannel | 7 bits | |
| BW request mandatory | 1 bit | 1 = yes, 0 = no |
| } | | |

The mobile station transmits a predetermined bandwidth request header for emergency through the second uplink bandwidth to forward information of the mobile station and request service related information to the base station (S205). An example of the bandwidth request header is illustrated in FIG. 3.

As illustrated in FIG. 3, the bandwidth request header includes at least one of items such as basic CID Of the mobile station, emergency service indicator, traffic priority, and type of data delivery service.

The emergency service indicator can be set to 1 if the mobile station requests an emergency service (Emergency Service Indication=1).

The traffic priority means priority allocated to a service flow, and provides low delay and high buffering setup if priority is high. If the mobile station requests an emergency service, the traffic priority is preferably set to the highest value (for example, Traffic priority=7).

A data delivery service specified in the type of data delivery service is related to a QoS related service flow parameter set which is previously defined. For example, '0' represents a continuing grant service, '1' represents a real time transmission service, '2' represents a non-real time transmission service, and '3' represents a best effort service, in accordance with the order of respective bits constituting the corresponding item.

The base station identifies whether the corresponding mobile station is effective, whether the QoS parameter set of the uplink/downlink emergency service flow requested from the corresponding mobile station can be supported, etc. based on information included in the bandwidth request header. If the QoS parameter set is supported, the base station generates a new service flow ID (SFID) and maps the generated SFID with CID of the corresponding mobile station (S207).

Subsequently, the base station transmits to the mobile station at least one of a confirmation code (CC) of the new service flow, SFID of the corresponding service, traffic CID mapped with SFID, and the corresponding QoS parameter set (S209). The step S209 can be performed through a message (for example, emergency service-RSP) which is newly defined for the emergency rescue service. An example of the emergency service-RSP is illustrated in Table 5 below.

TABLE 5

| Syntax | Size | Notes |
|---|---|---|
| Emergency Service-RSP_Message_Format( ) { | | |
| Management Message Type = 19 | 8 bits | |
| Traffic CID | 16 bits | |
| Confirmation Code | 8 bits | |
| TLV Encoded Information | variable | TLV specific |
| } | | |

Also, an example of the confirmation code (CC) is listed as follows.

TABLE 6

| CC | Status |
|---|---|
| 0 | OK/success |
| 1 | reject-other |
| 2 | reject-unrecognized-configuration-setting |
| 3 | reject-temporary/reject-RSPource |
| 4 | reject-permanent/reject-admin |
| 5 | reject-not-owner |
| 6 | reject-service-flow-not-found |
| 7 | reject-service-flow-exists |
| 8 | reject-required-parameter-not-present |
| 9 | reject-header-suppression |
| 10 | reject-unknown-transaction-id |
| 11 | reject-authentication-failure |
| 12 | reject-add-aborted |
| 13 | reject-exceeded-dynamic-service-limit |
| 14 | reject-not-authorized-for-the-requested-SAID |
| 15 | reject-fail-to-establish-the-requested-SA |

TABLE 6-continued

| CC | Status |
|---|---|
| 16 | reject-not-supported-parameter |
| 17 | reject-not-supported-parameter-value |
| 18 | OK-emergency service |
| 19 | Reserved |
| 20 | Reserved |

As illustrated in Table 6, the base station sets the confirmation code to 18 (CC=18) to report that the emergency service is supported. If the emergency service is not supported, the base station sets the confirmation code to any one of 1 to 17 (Confirmation Code=1 to 17).

Meanwhile, the base station can transmit the above information by using a conventional DSA_RSP message instead of the emergency service-RSP message. In this case, the bandwidth request header for the emergency service in the step S205 can be transmitted through the DSA-REQ message or a bandwidth allocated for transmission of the DSA-REQ message. However, in this case, the mobile station should separately request the emergency service through the DSA_REQ message. For this reason, restrictions occur in that the mobile station should transmit MAC information and should be allocated with separate resources.

The mobile station generates a service flow for the emergency service if the confirmation code is included in the emergency service-RSP message received from the base station (S211). If the base station allocates an uplink bandwidth corresponding to the uplink QoS parameter set through the UL-MAP (S213), the mobile station transmits emergency data to the base station through the corresponding uplink bandwidth (Emergency Operation).

<Embodiment 1-2>

This embodiment relates to a case where a mobile station which is being communicated with a base station requests an emergency service. Especially, this embodiment relates to a case where a mobile station uses a conventional initial ranging code instead of an emergency CDMA code to perform emergency communication.

Figure 4:
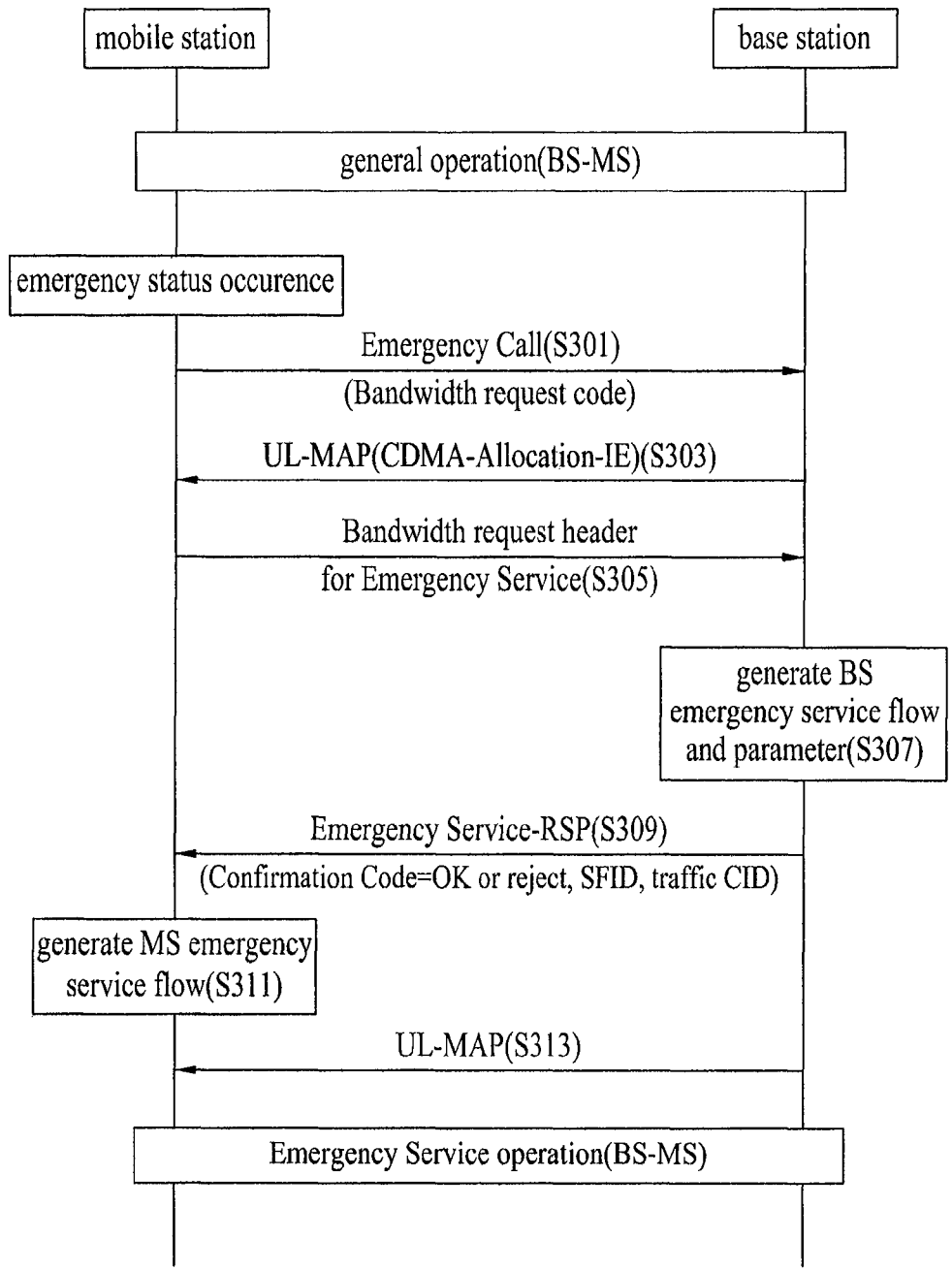
FIG. 4 is a signal flow chart illustrating another sequential procedure of establishing an emergency communication path in a mobile station which is being communicated with a base station.

FIG. 4 is a signal flow chart illustrating a sequential procedure of establishing an emergency communication path in a mobile station which is being communicated with a base station.

If an emergency status occurs in the mobile station, the mobile station selects a bandwidth request code from a code set included in the UCD message received from the base station, and transmits the selected bandwidth request code to the base station through a first uplink bandwidth (for example, RNG-REQ transmission bandwidth) which is previously allocated (S301). However, since the first uplink bandwidth is allocated based on contention, if there exists the mobile station which transmits the bandwidth request code for requesting other service, within the corresponding base station, request of the emergency service may be delayed due to collision between the base station and the mobile station.

Since later steps (S303 to S313) for the emergency service are the same as S203 to S213 of the embodiment 1-1, their description will be omitted.

<Embodiment 2-1>

This embodiment relates to a case where a mobile station requests an emergency service in a state that the mobile station is not connected with a base station. Especially, this embodiment relates to a case where a mobile station performs emergency service request by using an emergency CDMA code which is newly defined. This emergency service request can be performed before the mobile station performs ranging or authentication. Also, this emergency service request can be performed when the mobile station is not connected with the base station in an idle state.

Figure 5:
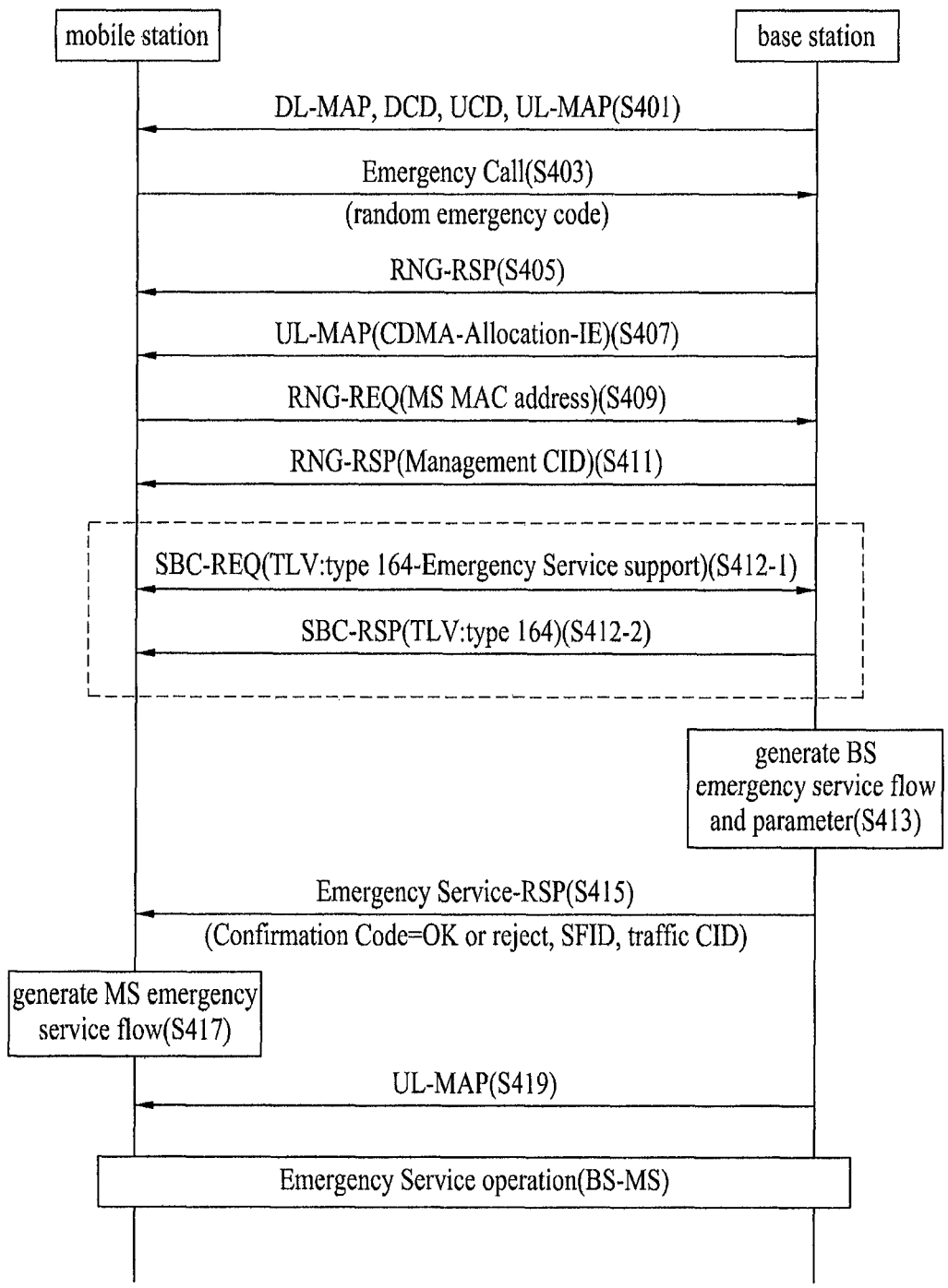
FIG. 5 is a signal flow chart illustrating a sequential procedure of establishing an emergency communication path in a mobile station which is not connected with a base station.

FIG. 5 is a signal flow chart illustrating a sequential procedure of establishing an emergency communication path in a mobile station which is not connected with a base station.

If the mobile station enters a cell or is powered on, the mobile station performs channel scan from a recently used downlink channel until available channel are found to adjust downlink synchronization (DL Sync) with the base station, and performs a ranging procedure by receiving a UCD message from the base station (S401).

The mobile station randomly selects any one of slots of a ranging subchannel allocated into a frame structure, and forwards a CDMA code for emergency communication to the base station through the selected slot (S403).

In detail, the mobile station randomly selects a ranging mode for the emergency service from the UCD message previously received from the base station, and transmits a CDMA code (for example, emergency CDMA code) of a corresponding mode by an uplink bandwidth through the selected slot. The uplink bandwidth is contentionally allocated through the UL-MAP_IE from the base station to the mobile stations.

The base station which has received the emergency CDMA code from the mobile station sets a transmission power adjustment value, time and frequency adjustment values, and ranging status, which are required for uplink transmission synchronization, and forwards the set values to the mobile station through a ranging response message (RNG-RSP message) (S405). In this case, if the uplink transmission parameters are completely adjusted, the ranging status is set to 'success.' Also, the base station allocates an uplink bandwidth by transmitting CDMA allocation information element (CDMA_Allocation_IE) to the mobile station, so that the corresponding mobile station can transmit the ranging request message (RNG-REQ) (S407). However, if the ranging status is set to 'continue,' the mobile station returns to step S403 and repeats steps S405 to S407 until the ranging status is set to 'success.'

The mobile station which has been allocated with the uplink bandwidth forwards the ranging request message (RNG-REQ) to the base station, wherein the ranging request message includes identifier (for example, MAC address) of the mobile station and emergency service information (S409). The emergency service information includes at least one of items such as emergency service indicator, traffic priority, and type of data delivery service.

The base station which has received the ranging request message forwards the ranging response message (RNG-RSP) to the mobile station, wherein the ranging response message includes Basic Management CID and Primary Management CID (S411).

In this way, after the initial ranging procedure is performed, the mobile station reports its basic function to the base station through a subscriber basic capability (SBC-REQ) message (S412-1). After identifying the basic function of the mobile station from the corresponding message, the base station defines the transmission power for the emergency service and data modulation and transmits the defined transmission power and data modulation to the mobile station through the SBC-RSP message (S412-2). Since the base station can previously set a QoS parameter of the corresponding mobile station through basic function negotiation procedures such as S412-1 and S412-2, a separate procedure for setting a QoS parameter can be omitted to provide the emergency service more promptly. However, the steps S412-1 and S412-2 are not necessarily required. An example of the SBC-REQ/RSP messages for the basic function negotiation is illustrated in Table 7.

TABLE 7

| Type | Length | Value | Scope |
|------|--------|-------|-------|
| 164 | 2 | Bits #0-7: Traffic Priority for Emergency Service | SBC-REQ |
| | | Bits #8-15: Type of Data Delivery Services | SBC-RSP |

In Table 7, each field specifies priority of an emergency service flow supported by the mobile station and type of data delivery service during uplink transmission. If a bit of a corresponding item is '1,' it represents that the corresponding item can be supported. If a bit of a corresponding item is '0,' it represents that the corresponding item cannot be supported.

The base station identifies whether the corresponding mobile station is effective, whether the QoS parameter set of the uplink/downlink emergency service flow requested from the corresponding mobile station can be supported, etc. based on information included in the bandwidth request header. If the QoS parameter set is supported, the base station generates a new service flow ID (SFID) and maps the generated SFID with CID of the corresponding mobile station (S413).

Subsequently, the base station transmits to the mobile station at least one of a confirmation code (CC) of the new service flow, SFID of the corresponding service, traffic CID mapped with SFID, and the corresponding QoS parameter set (S415). The step S415 can be performed through a message (for example, emergency service-RSP) which is newly defined for the emergency rescue service. Meanwhile, the base station can transmit the above information by using the conventional DSA_RSP message instead of the emergency service-RSP message, as described in the embodiment 1-1.

The mobile station generates a service flow for the emergency service if the confirmation code is included in the emergency service-RSP message received from the base station (S414). If the base station allocates an uplink bandwidth corresponding to the uplink QoS parameter set through the UL-MAP (S415), the mobile station transmits emergency data to the base station through the corresponding uplink bandwidth (Emergency Operation).

<Embodiment 2-2>

This embodiment relates to a case where a mobile station requests an emergency service in a state that the mobile station is not connected with a base station. Especially, this embodiment relates to a case where a mobile station performs emergency service request by using a conventional initial ranging code.

Figure 6:
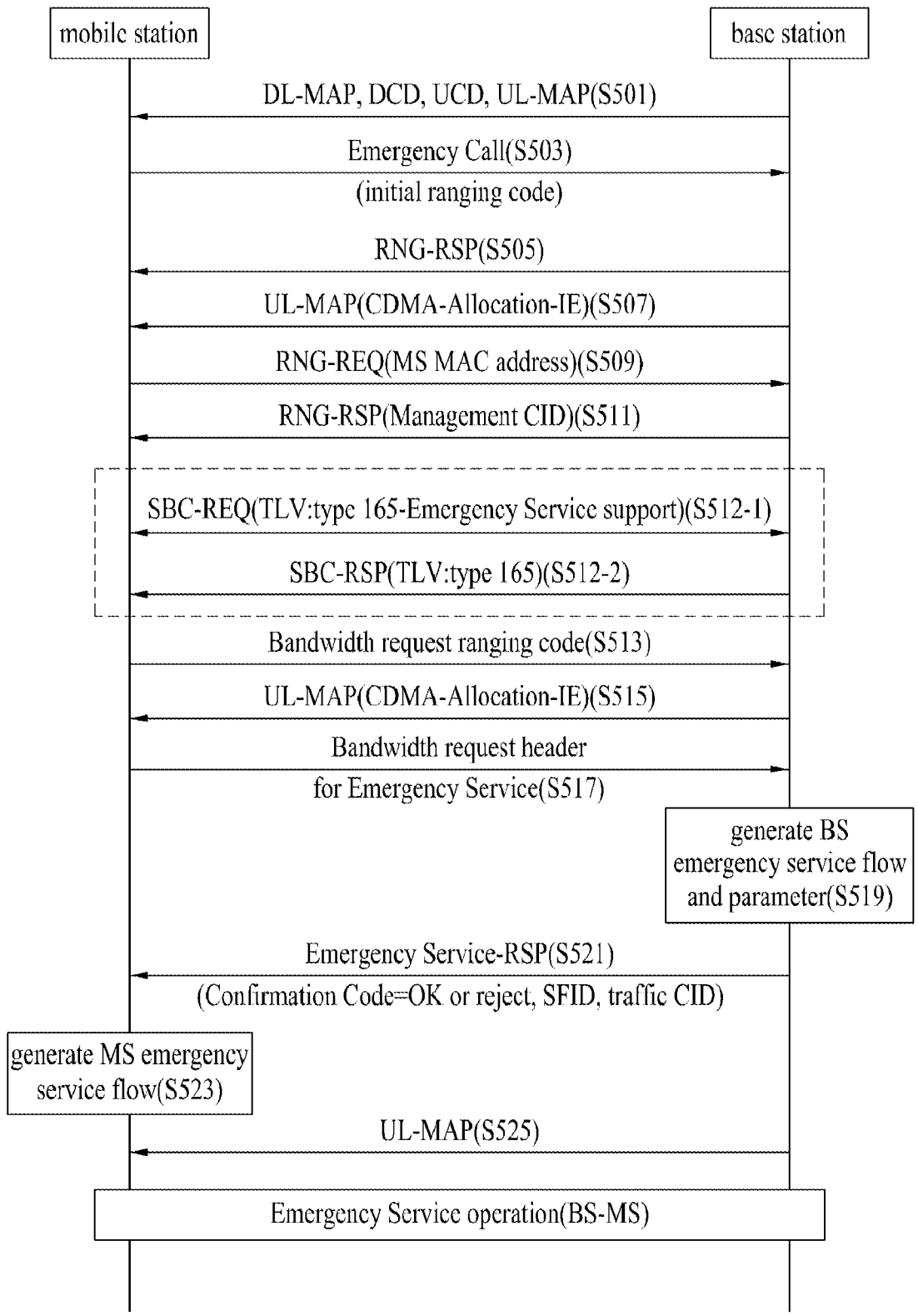
FIG. 6 is a signal flow chart illustrating a another sequential procedure of establishing an emergency communication path in a mobile station which is not connected with a base station.

FIG. 6 is a signal flow chart illustrating another sequential procedure of establishing an emergency communication path in a mobile station which is not connected with a base station.

If the mobile station enters a cell or is powered on, the mobile station performs channel scan from a recently used downlink channel until available channel are found to adjust downlink synchronization (DL Sync) with the base station, and performs a ranging procedure by receiving a UCD message from the base station (S501).

The mobile station randomly selects any one of slots of a ranging subchannel allocated into a frame structure, and forwards a CDMA code for emergency communication to the base station through the selected slot (S503). In this case, the conventional initial ranging code is used as the CDMA code.

Since later steps (S505 to S511) are the same as S405 to S411 of the aforementioned embodiment 2-1, their description will be omitted. Unlike the step S409, the emergency service information is not transmitted to the base station in the step S509. The emergency service information is transmitted through a predetermined bandwidth request header in step S517. Meanwhile, the steps S512-1 and S512-2 are the same as the steps S412-1 and S412-2 of the embodiment 2-1 and are not necessarily required.

The mobile station which has acquired basic management CID and primary management CID through the steps S505 to S511 requests the base station to allocate uplink resources for emergency communication by using a bandwidth request ranging code (S513).

If the bandwidth request ranging code is received from the mobile station, the base station allocates an uplink bandwidth through the uplink information element (for example, CDMA-Allocation_IE) of the uplink map (UL-MAP) so that the mobile station can perform ranging request (S515).

The mobile station transmits a predetermined bandwidth request header for emergency through the allocated uplink bandwidth to forward information of the mobile station and emergency service information to the base station (S517). In this case, the bandwidth request header includes at least one of items such as basic CID Of the mobile station, emergency service indicator, traffic priority, and type of data delivery service. Since the example of the bandwidth request header has been suggested in FIG. 3, the description of each item constituting the header will be omitted.

The base station identifies whether the corresponding mobile station is effective, whether the QoS parameter set of the uplink/downlink emergency service flow requested from the corresponding mobile station can be supported, etc. based on information included in the bandwidth request header. If the QoS parameter set is supported, the base station generates a new service flow ID (SFID) and maps the generated SFID with CID of the corresponding mobile station (S519).

Subsequently, the base station transmits to the mobile station at least one of a confirmation code (CC) of the new service flow, SFID of the corresponding service, traffic CID mapped with SFID, and the corresponding QoS parameter set (S521). The step S521 can be performed through a message (for example, emergency service-RSP) which is newly defined for the emergency rescue service.

Meanwhile, in this embodiment, the base station can transmit the above information by using the conventional DSA_RSP message instead of the emergency service-RSP message, as described in the embodiment 1-1.

The mobile station generates a service flow for the emergency service if the confirmation code is included in the emergency service-RSP message received from the base station (S523). If the base station allocates an uplink bandwidth corresponding to the uplink QoS parameter set through the UL-MAP, the mobile station transmits emergency data to the base station through the corresponding uplink bandwidth (Emergency Operation).

Meanwhile, in the embodiment 2-1 and the embodiment 2-2, if the mobile station performs emergency communication at the time when the ranging procedure ends and authentication of the mobile station starts, the mobile station can set emergency call by transmitting the bandwidth request header for the emergency service by the uplink bandwidth allocated for authentication.

Figure 7:
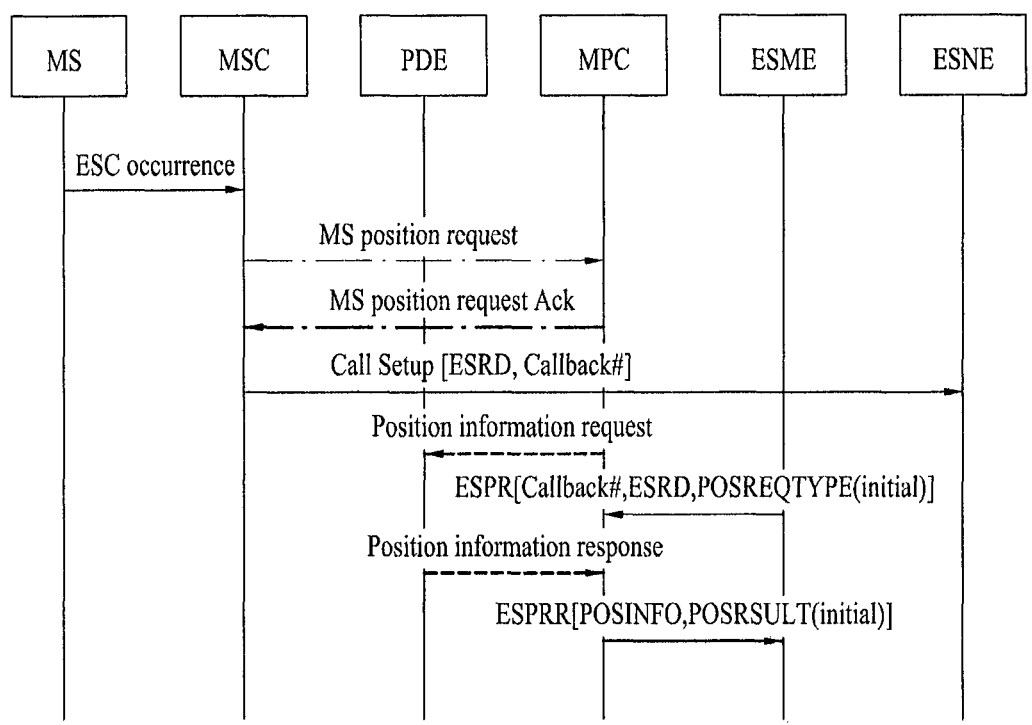
FIG. 7 is a signal flow chart illustrating a sequential procedure of performing emergency rescue in an emergency rescue service network.

Meanwhile, when the call for the emergency rescue is connected with the base station in accordance with the aforementioned embodiments, a procedure of performing emergency rescue in an emergency rescue service network will be described in detail as follows. FIG. 7 is a signal flow chart illustrating this procedure.

First of all, various entities configuring the emergency rescue service network will be described in brief.

An emergency service message entity (ESME) is in charge of message processing and routing related to the emergency rescue service, and performs a function related to the emergency rescue service by interworking with an emergency service network entity (ESNE) and an automatic location identification (ALI) DB engine.

A mobile position center (MPC) interworks with a position determining entity (PDE) and a mobile switching center (MSC) to collect the position of the mobile station and performs a position information management function.

The mobile switching center (MSC) performs a call setup and relay function between wireless mobile communication subscribers or between a wireless mobile communication subscriber and an public network, and performs an interworking function with the emergency rescue service.

The emergency service network entity (ESNE) interworks with the MSC with respect to emergency call, and performs connection processing and routing in respect of general voice, a communication device for deafness and dumbness, and a teletypewriter service.

A position determining entity (PDE) provides a geographic position calculating function of the mobile station, and performs a function for measuring the position of the mobile station by using various position measuring methods and a unique position measuring algorithm.

The automatic location identification (ALI) provides position information and name related to a telephone number of a user who has requested emergency call.

The procedure of performing the emergency rescue service through the aforementioned entities configuring the network will be described below.

If call for emergency rescue occurs in the mobile station (S501), the mobile switching center (MSC) requests the mobile position center (MSC) of position information of the corresponding mobile station (S502).

The mobile position center (MPC) transmits an acknowledgement (ACK) message in response to the request of the MSC (S503). At this time, the acknowledgement message does not include position information of the mobile station, and is to report that the request of position information has been normally received.

If the request of position information is authenticated from the MPC, the MSC forwards emergency rescue call to the emergency rescue service network (S504).

The MPC requests the position determining entity (PDE) of position information asynchronously with the emergency rescue service network and acquires the position information (S505).

The emergency service network entity (ESNE) requests MPC of a wireless core network to provide position information of the forwarded request of the emergency rescue service (S506), and receives position information from the PDE through the MPC (S507, S508).

Figure 8:
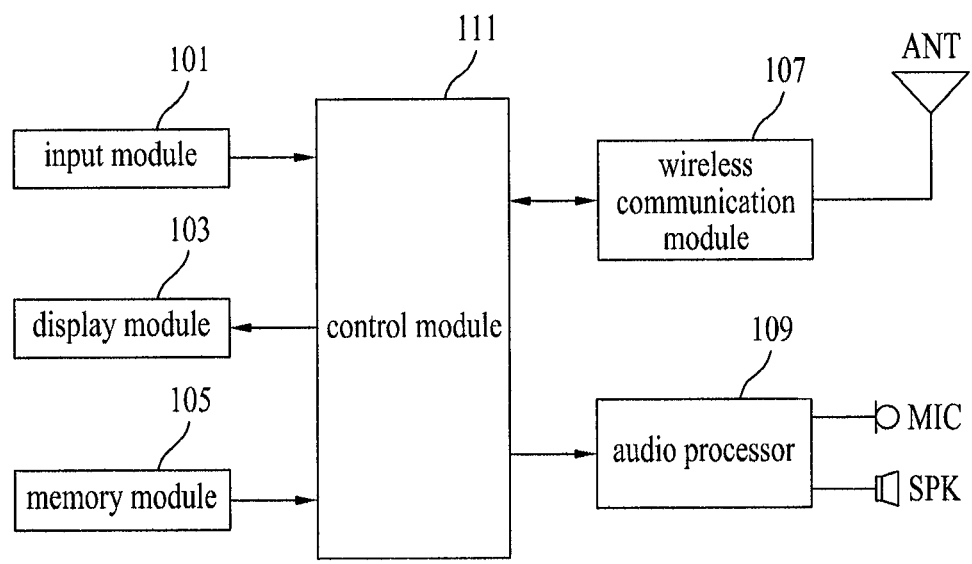
FIG. 8 is a block diagram illustrating a configuration of a mobile station according to the present invention.

Finally, a configuration of the mobile station which supports the emergency communication method according to the present invention will be described. FIG. 8 is a block diagram illustrating the configuration of the mobile station according to the present invention.

The mobile station includes an input module 101 selecting a desired function or inputting information, a display module 103 displaying various kinds of information for operating the mobile station, a memory module 105 storing various programs required to operate the mobile station and data to be transmitted to a receiving side, a wireless communication module 107 receiving an external signal and transmitting data to the receiving side, an audio processor 109 converting a digital audio signal into an analog audio signal, amplifying the converted audio signal, and outputting the amplified signal to a speaker (SP), or amplifying an audio signal from a mike (MIC) and converting the amplified signal into a digital signal, and a control module 111 controlling entire driving of the mobile station.

Particularly, the control module 111 requests the base station to allocate a first uplink bandwidth to request the emergency service after the mobile station is registered with the base station, transmits information of the mobile station and basic requirements for the emergency service through the first uplink bandwidth, generates a flow of the corresponding emergency service if identification information related to the emergency service generated in accordance with the basic requirements is transmitted from the base station, and performs emergency communication with the base station through a second uplink bandwidth allocated from the base station. Since the other detailed functions for requesting the emergency service are the same as those described in the embodiment 1-1 and the embodiment 1-2, their description will be omitted.

Furthermore, the control module 111 registers the mobile station with the base station through initial ranging to request the emergency service in a state that the mobile station is not registered with the base station, acquires management CID from the base station, generates a flow of the corresponding emergency service if identification information related to the emergency service is received from the base station, and performs emergency communication with the base station through an uplink bandwidth allocated for emergency call connection. At this time, the control module 111 may further include a function for negotiating the basic requirements of the mobile station for the emergency service with the base station. Since the other detailed functions for requesting the emergency service are the same as those described in the embodiment 2-1 and the embodiment 2-2, their description will be omitted.

Meanwhile, examples of the mobile station according to the present invention include personal digital assistant (PDA), cellular phone, personal communication service (PCS) phone, global system for mobile (GSM) phone, wideband CDMA (WCDMA) phone, and mobile broadband system (MBS) phone.

INDUSTRIAL APPLICABILITY

According to the present invention, if the mobile station requests the base station to provide the emergency service in a state that it is registered with the base station or it is not registered with the base station, it is possible to remarkably lower the probability of collision between the mobile stations by requesting the base station of the emergency service using the newly defined emergency code or the conventional bandwidth request code or using the conventional initial ranging code. Also, since repetition of unnecessary resource allocation can be avoided by previously reporting an emergency status in case of a bandwidth allocation request, it is possible to promptly provide an emergency service.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of performing emergency communication at a mobile station in a broadband wireless access system, the method comprising:
   transmitting a dynamic service addition (DSA) request message, including an indicator indicating an emergency service or non-emergency service, to a base station; and receiving a DSA response message, including a service flow identifier for the emergency service or the non-emergency service, from the base station in response to the DSA request message; and
   operating in a connected state,
   wherein if the indicator indicates the emergency service, then the service flow identifier is an emergency service flow identifier (emergency service FID) and the base station allocates the emergency service flow identifier without considering whether to approve an emergency service request according to the DSA request message.

2. The method according to claim 1, further comprising:
   receiving uplink resource allocation information according to parameters for the emergency service from the base station; and
   transmitting emergency service data through an uplink resource indicated by the uplink resource allocation information to the base station by using the emergency service flow identifier.

3. The method according to claim 2, wherein the parameters for the emergency service are negotiated via a dynamic service addition transaction.

4. The method according to claim 2, wherein the parameters for the emergency service are predefined.

5. A mobile station for performing emergency communication in a broadband wireless access system, the mobile station comprising:
   a radio frequency (RF) module configured to:
   transmit a dynamic service addition (DSA) request message, including an indicator indicating an emergency service or non-emergency service, to a base station; and
   receive a DSA response message, including a service flow identifier for the emergency service or the non-emergency service, from the base station in response to the DSA request message; and
   a controller configured to operate the mobile station in a connected state,
   wherein if the indicator indicates the emergency service, then the service flow identifier is an emergency service flow identifier (emergency service FID) and the base station allocates the emergency service flow identifier without considering whether to approve an emergency service request according to the DSA request message.

6. The mobile station of claim 5, wherein the radio frequency (RF) module is further configured to:
   receive uplink resource allocation information according to parameters for the emergency service from the base station; and
   transmit emergency service data through an uplink resource indicated by the uplink resource allocation information to the base station by using the emergency service flow identifier.

7. The mobile station of claim 6, wherein the parameters for the emergency service are negotiated via a dynamic service addition transaction.

8. The mobile station of claim 6, wherein the parameters for the emergency service are predefined.

9. A method of performing emergency communication at a base station in a broadband wireless access system, the method comprising:
   receiving a dynamic service addition (DSA) request message, including an indicator indicating an emergency service or non-emergency service, from a mobile station;
   transmitting, a DSA response message, including a service flow identifier for the emergency service or the non-emergency service, to the mobile station in response to the DSA request message;
   operating in a connected state with the mobile station; and
   if the indicator indicates the emergency service, then the service flow identifier is an emergency service flow identifier (emergency service FID) and allocating the emergency service flow identifier without considering whether to approve an emergency service request according to the DSA request message.

10. A base station for performing emergency communication in a broadband wireless access system, the base station comprising:
    a receiver configured to receive a dynamic service addition (DSA) request message, including an indicator indicating an emergency service or non-emergency service, from a mobile station;
    a transmitter configured to transmit a DSA response message, including a service flow identifier for the emergency service or the non-emergency service, to the mobile station in response to the DSA request message; and
    a controller configured to:
    control the receiver and the transmitter;
    operate in a connected state with the mobile station; and
    if the indicator indicates the emergency service, then the service flow identifier is an emergency service flow identifier (emergency service FID) and allocate the emergency service flow identifier without considering whether to approve an emergency service request according to the DSA request message.

* * * * *